United States Patent [19]
Gruffaz et al.

[11] 3,954,711
[45] May 4, 1976

[54] THERMOSETTING POLYMERS FROM A POLYIMIDE AND AMMONIA

[75] Inventors: Max Gruffaz, La-Mulatiere; Pierre Ledru, Lyon, both of France

[73] Assignee: Rhone-Poulenc, S.A., Paris, France

[22] Filed: Mar. 4, 1974

[21] Appl. No.: 447,522

[30] Foreign Application Priority Data
Mar. 7, 1973  France .............................. 73.08142

[52] U.S. Cl. .................... 260/47 UA; 260/29.6 HN; 260/30.2; 260/32.6 NA; 260/33.4 R; 260/47 CZ; 260/65; 260/78 UA
[51] Int. Cl.² ................... C08G 69/02; C08G 69/26
[58] Field of Search ....... 260/78 UA, 47 CZ, 47 UA

[56] References Cited
UNITED STATES PATENTS
3,669,930   6/1972   Asahara et al. ................. 260/78 UA OTHER PUBLICATIONS
Sheremetera et al., Journal of Polymer Science, Part C, No. 16, pp. 1631–1646 (1967).

*Primary Examiner*—Harold D. Anderson
*Attorney, Agent, or Firm*—Stevens, Davis, Miller & Mosher

[57] ABSTRACT

Thermosetting polymers, both prepolymers and cured resins, are produced by reacting ammonia with a polyimide of the formula:

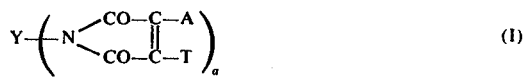

in which *a* is a number from 2 to 4, Y represents an organic radical of valency a, and A and T, which may be identical or different, each represent hydrogen, chlorine or methyl, the proportions of polyimide and ammonia being such that there are at least 2 imide groups per mol of ammonia. These polymers find utility in the production of materials liable to undergo severe heat stresses.

10 Claims, No Drawings

THERMOSETTING POLYMERS FROM A POLYIMIDE AND AMMONIA

The present invention relates to new thermosetting polymers.

It is known (see, for example, Frensh Patent No. 1,555,564) that when a bis-imide of an unsaturated dicarboxylic acid, such as a bis-maleimide, is reacted with a diprimary diamine, polymers of high molecular weight can be produced which possess especially noteworthy resistance to heat stresses.

It is also known (see T.V. SHEREMETEVA, Journal of Polymer Science, Part C, No. 16, pages 1635–1640, 1967) that by reacting ammonia with a mono-maleimide or citraconimide, either the diamide of the corresponding acid or the product resulting from the addition of ammonia to the double bond is produced, depending on the reaction conditions. The first can be obtained using aqueous ammonia, the second using ammonia in absolute alcohol.

It has now been found according to the present invention, that it is possible to produce polymers of high molecular weight by reacting ammonia with a poly-maleimide.

According to the present invention there is provided a process for preparing a thermosetting polymer which comprises reacting ammonia with a polyimide of the formula:

(I)

in which the symbol Y represents an organic radical of valency $a$, and $a$ is a (whole or fractional) number ranging from 2 to 4, and the symbols A and T, which may be identical or different, each represents H, $CH_3$ or Cl, the proportions of the reagents being such that there are at least 2 imide groups per mol of ammonia.

It must be emphasised that the reaction of the polyimide with ammonia leads ultimately to cured products or resins which are insoluble in the usual solvents and which do not soften significantly below the temperature at which they begin to undergo degradation. However, before reaching this final stage, the reaction mixture usually passes through a stage where it is possible to collect a product, referred to hereafter as a prepolymer, the physical and chemical properties of which are of course different from those of the starting materials, and which is soluble in polar organic solvents such as N-methylpyrrolidone and possesses a softening point at a temperature not exceeding 250°C, generally 50° to 250°C. It is to be understood that the present invention relates to any product resulting from the reaction of poly-maleimide with ammonia, in the specified proportions, and thus relates both to the prepolymers and to the resins.

In Formula (I) the symbol Y can represent a divalent radical such as a linear or branched alkylene radical with 2 to 12 carbon atoms, a phenylene radical, a cyclohexylene radical or a radical of the formula:

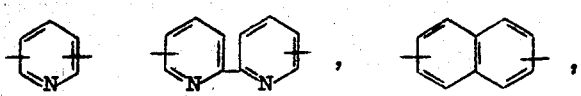

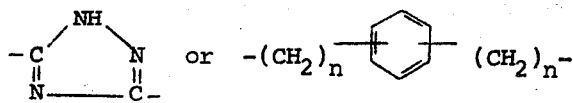

wherein $n$ represents an integer from 1 to 3, Y can also represent a plurality of phenylene or cyclohexylene radicals bonded to one another by a simple valency bond or by an inert atom or group such as —O—, —S—, an alkylene group with 1 to 3 carbon atoms, —CO—, —$SO_2$—, —CONH—, —COO—, —P(O)$R_1$—, —CONHX—X—NHCO—,

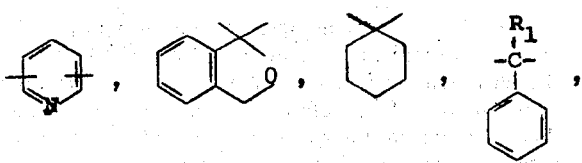

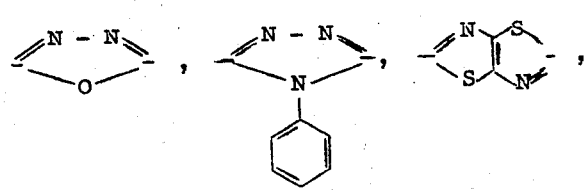

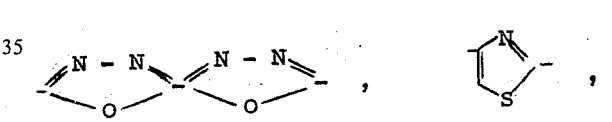

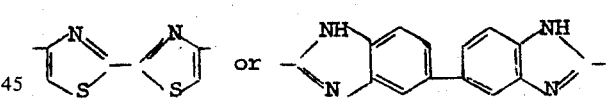

wherein $R_1$ represents a hydrogen atom, an alkyl radical with 1 to 4 carbon atoms, a phenyl radical or a cyclohexyl radical, and X represents an alkylene radical with 2 to 12 carbon atoms. Moreover, the various phenylene or cyclohexylene radicals can be substituted by methyl groups. The symbol Y can also represent a radical which is tri- or tetra-valent, the valencies of which are carried by a benzene ring optionally substituted by methyl groups, a naphthalene nucleus, a pyridine nucleus or a triazine nucleus; they can also be carried by several benzene rings bonded to one another by a simple valency bond or by an inert atom or group which can be one of those described above in connection with the divalent Y radicals, or

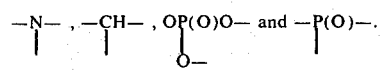

Specific examples of polyimides of formula (I), which may be used include bis-imides such as: N,N'-ethylenebis-maleimide, N,N'-hexamethylene-bismaleimide, N,N'-metaphenylene-bis-maleimide, N,N'-para-phenylene-bis-maleimide, N,N'-4,4'-diphenylmethane-bis-maleimide, N,N'-4,4'-(diphenyl ether)-bis-maleimide, N,N'-4,4'-diphenylsulphone-bis-maleimide, N,N'-4,4'-dicyclohexylmethane-bis-maleimide, N,N'-4,4'-(3,5-diphenyl-pyridine)-bis-maleimide, N,N'-pyridine-2,6-diyl-bis-maleimide, N,N'-α,α'-4,4'-dimethylenecyclohexane-bis-maleimide, N,N'-meta-xylylene-bis-maleimide, N,N'-para-xylylene-bis-maleimide, N,N'-4,4'-diphenylcyclohexane-bis-maleimide, N,N'-meta-phenylene-bis-dichloromaleimide, N,N'-4,4'-diphenylmethane-bis-citraconimide, N,N'-4,4'-(1,1-diphenyl-propane)-bis-maleimide, N,N'-4,4'-(1,1,1-triphenyl-ethane)-bis-maleimide, N,N'-4,4'-triphenylmethane-bis-maleimide and N,N'-3,5-(1,2,4-triazole)-bis-maleimide.

These bis-imides can be prepared by applying the methods described in U.S. Pat. No. 3,018,290 and British Patent Specification No. 1,137,592. Examples of polyimides of formula (I), in which there are more than 2 imide groups per molecule include oligomers with imide groups of the general formula:

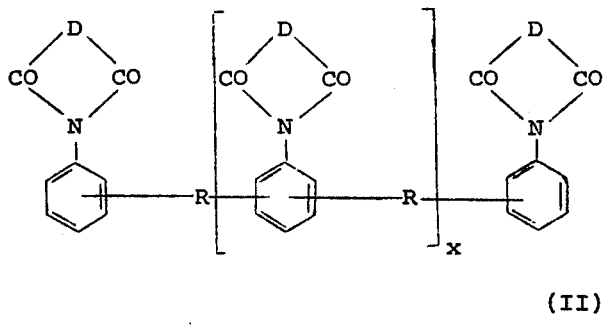

(II)

in which x represents a number ranging from 0.1 to about 2, the symbol R represents a divalent hydrocarbon radical with 1 to 8 carbon atoms derived from an aldehyde or a ketone of the general formula:

O = R in which the oxygen atom is bonded to a carbon atom of the radical R, and the symbol D represents a divalent organic radical possessing 2 to 24 carbon atoms, the valencies of which are carried by adjacent carbon atoms and which is derived from an internal anhydride of the general formula:

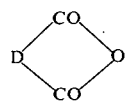

at least about 60% of the D radicals representing a radical of the formula:

in which the symbols A and T are as defined above, it being possible for any remaining D radicals to represent, for example, an alkylene, cycloalkylene, aromatic, carbocyclic or heterocyclic radical. The preparation of polyimides of formula (II) is described in, for example, German Patent Application No. 2,230,874.

The conditions under which the polymers of the present invention are prepared can vary within wide limits. In particular, the ammonia can be employed in the anhydrous state or in the form of an aqueous or organic solution, especially in alcohol, e.g. ethanol, or in mixtures of water and alcohol. The polyimide can itself be employed in the molten state, in the form of a solution in a polar solvent such as N-methylpyrrolidone, dimethylformamide, dimethylacetamide, N-methylcaprolactam or N-acetylpyrrolidone, or in the form of a suspension, for example in water or an organic medium such as an alcohol. According to a preferred procedure, the ammonia is used in the form of an aqueous solution and the polyimide is employed in solution or in suspension. This method of working enables an intimate mixture of the reagents to be obtained easily. Moreover, it makes it possible readily to determine the proportions of the reagents.

As stated above, the proportions of the reagents are such that there are at least 2 imide groups per mol of ammonia. The upper limit for the ratio $$\frac{\text{number of imide groups}}{\text{number of mols of NH}_3}$$

can generally be at least 100/1. This ratio is preferably from 2/1 to 10/1.

It is to be understood that when ammonia is used in the form of a solution, the concentration of the latter is not critical. The upper concentration limit is fixed only by the solubility of ammonia in the solvent at the temperature at which the solution is prepared. The lower limit is essentially set by practical considerations such as the handling of as small quantities as possible of products which do not take part in the reaction.

The temperature at which the ammonia and polyimide are reacted can vary greatly, the choice of the temperature naturally affecting the time for which the reaction mixture should be kept at this temperature. Except for the case where the polyimide is employed in the molten state and where, consequently, the reaction mixture must be kept at a temperature at least equal to the melting point of the polyimide, the reaction can, in general terms, be carried out at a temperature not exceeding 200°C, preferably from −30° to 150°C., the precise temperature depending on the nature and the physical state of the reagents employed. After a period of time which generally varies from a few minutes, say 3 to 5 minutes, to 2 hours, a prepolymer is obtained, the softening point of which can vary from, for example, 50° to 250°C. This prepolymer can be used in powder form, for example for producing compression-moulded articles, or in the molten state, especially for producing mouldings by casting, or in the form of a solution in a polar solvent such as those mentioned above, for example for producing laminates.

The prepolymer can be cured and converted to a resin which is insoluble in the usual solvents by heating at temperatures of, for example, 150° to 350°C., at atmospheric pressure of under a pressure which can be as high as 250 bars.

The following Examples further illustrate the present invention.

EXAMPLE 1

900 g of N,N'-4,4'-diphenylmethane-bis-maleimide are dispersed, at ambient temperature (21°C), in 1,098 g of dimethylformamide (DMF).

105 g of an aqueous solution of ammonia containing 18.2% by weight of $NH_3$ are introduced by means of a dropping funnel, over the course of 8 minutes, into the dispersion. During the running-in process, the temperature rises to 42°C. The mixture is heated to 60°C and, after 10 minutes, a clear solution (S) is obtained. The solution is cooled to 24°C over the course of 40 minutes, and then, with vigorous stirring, the polymer is precipitated in 6 liters of deionised water. The polymer is filtered off, washed with water and dried in an oven at 50°C to constant weight and then in vacuo (1 mm Hg) at 80°C for 7 hours.

911 g of a polymer with a softening point of 140°C are collected.

The polymer is screened (800 μ mesh) and then 100 g of the resulting powder is collected and placed in a cylindrical mould (diameter 130 mm). It is heated at 200°C for 5 minutes under 20 bars pressure and then for 1 hour under 100 bars pressure. The disc (thickness 6 mm) is stoved for 24 hours at 250°C in an oven.

The mechanical properties of the resulting disc are as follows:

Fs = flexural strength: $kg/mm^2$
Fm = flexural modulus: $kg/mm^2$

| Measurement | Initial | | After ageing at 250°C | | | | | |
| --- | --- | --- | --- | --- | --- | --- | --- | --- |
| | | | 100 hrs. | | 250 hrs. | | 500 hrs. | |
| | Fs | Fm | Fs | Fm | Fs | Fm | Fs | Fm |
| at 25°C | 11.4 | 370 | 10.4 | 370 | 8.9 | 370 | 5.1 | 370 |
| at 250°C | 7.4 | 310 | 5.5 | 310 | 4.5 | 305 | 4.8 | 310 |

EXAMPLE 2

300 g of the bis-imide of Example 1 are dispersed in 366 g of DMF. 55 g of an aqueous solution of amminia (18.2% by weight of $NH_3$) are run in over 7 minutes. The temperature rises to 49°C. The mixture is heated to 55°C and, after 6 minutes, a clear solution is obtained. The solution is cooled to 24°C over 25 minutes. The polymer is precipitated in 2 litres of water, filtered off, washed and dried as in Example 1. 305.5 g of a polymer which softens at 173°C are collected.

100 g of polymer, screened as in Example 1, are placed in a cylindrical mould (diameter 130 mm) which is heated to 150°C and is then placed in a press at 220°C under 200 bars pressure for 1 hour. The polymer is stoved for 24 hours at 250°C.

The resulting mechanism properties (measured at 25°C) are as follows:

| | Initial | After ageing at 250°C | |
| --- | --- | --- | --- |
| | | 500 hrs. | 1,000 hrs |
| Fs ($kg/mm^2$) | 10.8 | 8.5 | 7.8 |
| Fm ($kg/mm^2$) | 369 | 388 | 361 |

EXAMPLE 3

166 g of 2-N-methylpyrrolidone (NMP) and 11 g of an aqueous solution of ammonia (18.2% by weight of $NH_3$) are mixed in a reactor. 100 g of the bis-maleimide of Example 1 are introduced over the course of 9 minutes. The temperature rises to 34°C.

The mixture is heated to 55°C and a clear solution is obtained. The solution is cooled to 22°C, its viscosity is then less than 0.5 poise. The concentration of the solution is 37% (gram of solids per gram of solution). The softening point of the polymer is 90°C (measured after precipitation, filtration, washing and drying as in Example 1).

This solution is used to coat 300 $g/m^2$ glass fabric (silionne-treated satin-type which has been desized by heat and treated with an amino-silane). 35 g of dry polymer are deposited per 65 g of glass fabric.

The whole is dried in a ventilated oven at 140°C for 5 minutes. The amount of solvent remaining represents 17%, relative to the weight of the solution deposited.

Twelve 15 × 15 cm squares are cut out of the fabric and are superposed and then the whole is placed in a press (pressure 60 bars) for 15 minutes at 160°C and then for 75 minutes at 180°C. The laminate is stoved for 24 hours at 200°C.

The mechanical properties of the resulting laminate are as follows:

| | Initial | | After 100 hours at 250°C | |
| --- | --- | --- | --- | --- |
| | Fs ($kg/mm^2$) | Fm ($kg/mm^2$) | Fs ($kg/mm^2$) | Fm ($kg/mm^2$) |
| Measurement at 25°C | 44.50 | 2,121 | not measured | |
| Measurement at 200°C | 36.0 | 1,966 | not measured | |
| Measurement at 250°C | 32.8 | 1,947 | 21 | 1.820 |

EXAMPLE 4

The solution (S) of Example 1 (concentration 44% by weight) is used to coat glass fabric (satin-type as in Example 3). The amount of polymer deposited is 35 g per 65 g of fabric. The whole is dried in an oven for 1 minute at 140°C and then the fabric is immersed in water at 50°C (dwell time: 30 minutes) and placed back in the oven for 6 minutes at 140°C. The amount of solvent remaining is approximately 5.5%.

A laminate is manufactured under the conditions described in Example 3 and is then stoved for 24 hours at 200°C.

The following properties are observed:

| | Initial | | After 1,000 hrs. at 250°C | | After 2,500 hrs. at 250°C | |
| --- | --- | --- | --- | --- | --- | --- |
| | Fs ($kg/mm^2$) | Fm ($kg/mm^2$) | Fs ($kg/mm^2$) | Fm ($kg/mm^2$) | Fs ($kg/mm^2$) | Fm ($kg/mm^2$) |
| x | 54 | 2,330 | | | | |
| xx | 34.6 | 1,920 | 23 | 1,930 | 8 | 1,530 | x: measurement at 25°C
xx: measurement at 250°C

EXAMPLE 5

Anhydrous ammonia is injected into a suspension of 300 g of the bis-imide of Example 1 in 366 g of dimethylformamide, the suspension being stirred and kept at +20°C.

During the reaction, the solid dissolves. When 10 g of ammonia have been absorbed, the polymer is precipitated in 1 liter of vigorously stirred water. The resulting polymer is washed four times with 1 liter of water at 30°C; the precipitate is then dried to constant weight at 100°C under a reduced pressure (2 mm Hg). The polymer obtained softens at 190°C.

EXAMPLE 6

The experiment of Example 5 is repeated, keeping the suspension of bis-imide at −20°C. The polymer is precipitated after absorption of 12.5 g of ammonia.

The softening point of the polymer is 154°C.

We claim:

1. A process for preparing a thermosetting polymer which is soluble in polar organic solvents and has a softening point not exceeding 250°C. which consists essentially of reacting ammonia with a polyimide of the formula:

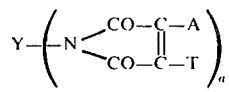  (1)

in which $a$ is a number from 2 to 4, Y represents an organic radical of valency $a$, and A and T, which may be identical or different, each represents hydrogen, chlorine or methyl, the proportions of polyimide and ammonia being such that there are at least 2 imide groups per mol of ammonia.

2. A process according to claim 1, in which the ratio number of imide groups/number of mols of ammonia is from about 2/1 to about 100/1.

3. A process according to claim 2 in which the said ratio is from about 2/1 to about 10/1.

4. A process according to claim 1, for preparing a polymer which is soluble in N-methylpyrrolidone and has a softening point from about 50° to about 250°C, which process comprises reacting the polyimide and ammonia at a temperature of from −30° to to 200°C for a few minutes to 2 hours.

5. A process according to claim 4, in which the ammonia is used in the form of an aqueous solution.

6. A process according to claim 4, in which the ammmonia is used in the anhydrous state.

7. A process according to claim 4, in which the polyimide is used in the form of a suspension or a solution in an organic medium.

8. A process according to claim 1, for preparing a polymer which is insoluble in organic solvents and does not undergo significant softening below the temperature at which it starts to degrade, which process consists essentially of heating the polymer produced by the process of claim 1 in which Y represents a linear or branched alkylene radical with 2 to 12 carbon atoms, a phenylene radical, a cyclohexylene radical or a radical of the formula:

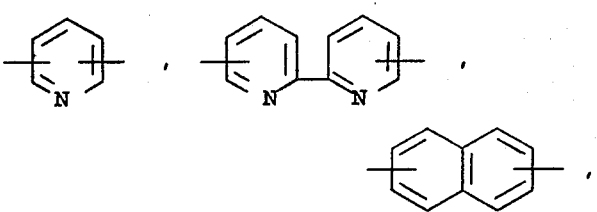

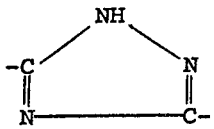

or

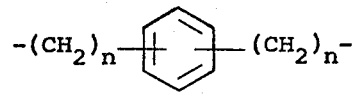

wherein $n$ represents an integer from 1 to 3, or a plurality of phenylene or cyclohexylene radicals bonded to one another by a simple valency bond or by —O—, —S—, an alkylene group with 1 to 3 carbon atoms, —CO—, —SO$_2$—, —CONH—, —COO—, —P-(O)R$_1$—, —CONHX—X—NHCO—,

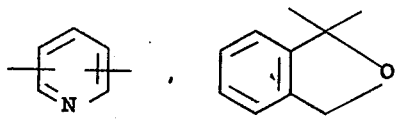

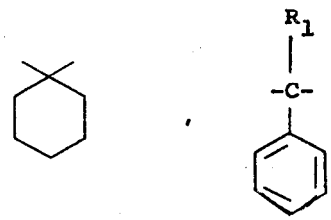

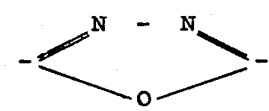

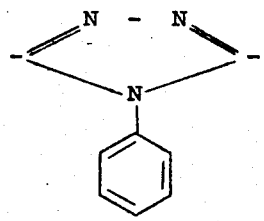

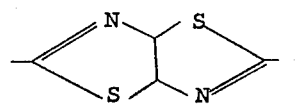

9

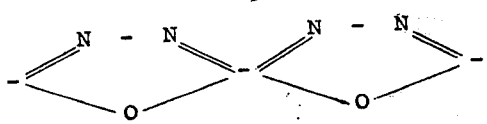

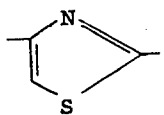

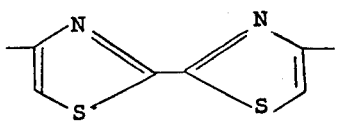

or

10

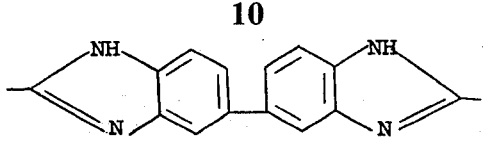

wherein $R_1$ represents a hydrogen atom, an alkyl radical with 1 to 4 carbon atoms, a phenyl radical or a cyclohexyl radical, and X represents an alkylene radical with 2 to 12 carbon atoms, and which is soluble in N-methylpyrrolidone and has a softening point from about 50° to about 250°C., at a temperature of from about 150° to 350°C. and at a pressure from atmospheric pressure to about 250 bars pressure.

9. A polymer which is soluble in N-methylpyrrolidone and has a softening point from 50° to 250°C prepared by reacting a polyimide as defined in claim 1 and ammonia at a temperature of from about −30° C to 200°C for a few minutes to 2 hours, the proportions of polyimide and ammonia being such that there are at least 2 imide groups per mol of ammonia.

10. A polymer which is insoluble in organic solvents and does not undergo significant softening below the temperature at which it starts to degrade, prepared by reacting a polymer as defined in claim 9 at a temperature from about 150° to 350°C and at a pressure from atospheric pressure to about 250 bars pressure.

* * * * *